INVENTOR.
JOHN C. GIBSON
BY Kegan, Bellamy & Kegan
ATTORNEYS

PRIMARY-SECONDARY LINK-SPREAD CROSSBAR SELECTOR SYSTEM

Filed May 29, 1959

PRIMARY-SECONDARY LINK-SPREAD CROSSBAR SELECTOR SYSTEM

Filed May 29, 1959 6 Sheets-Sheet 5

Jan. 16, 1962 J. C. GIBSON 3,017,465

PRIMARY-SECONDARY LINK-SPREAD CROSSBAR SELECTOR SYSTEM

Filed May 29, 1959 6 Sheets-Sheet 6

United States Patent Office 3,017,465

Patented Jan. 16, 1962

3,017,465

PRIMARY-SECONDARY LINK-SPREAD CROSSBAR SELECTOR SYSTEM

John C. Gibson, Oak Lawn, Ill., assignor to International Telephone and Telegraph Corporation, New York, N.Y., a corporation of Maryland

Filed May 29, 1959, Ser. No. 816,801
12 Claims. (Cl. 179—22)

This invention relates to primary-secondary link-spread crossbar selector systems generally, but is concerned more particularly with systems of that type which employ overflow links between the primary and secondary switches in addition to the normal links between them.

A principal object of the invention is to provide a crossbar selector system of the foregoing character which is more economical in switching crosspoints than heretofore, and which is more readily adaptable to meeting the varying size requirements encountered in switching systems while maintaining economy in switching apparatus for systems of relatively small size.

Heretofore, considering telephone switching apparatus as a leading example, it has been recognized that primary-secondary selector switching systems which employ links extending from the primary switches and spread among the secondary switches, if of a selected size (such as 100, 150, or 200 incoming trunk paths), are considerably more economical in crosspoints than are selector switching systems of the same size which employ direct-access switching principles, but may not offer nearly as much economy in crosspoints when installed in smaller sizes, largely because of the practical necessity of rendering a small size selector system expandable to large size when future growth demands by installing primary and secondary switches each of a size suitable for the expected eventual larger system size. The full number of secondary switches is installed, and the selector system is adapted to small size merely by eliminating the unneeded primary switches. Moreover, most prior systems of the foregoing type have substantially as much control apparatus for a small system as is needed for a large system, thus rendering the cost of control apparatus per incoming trunk path in a small system unduly large.

According to the invention, the foregoing and other difficulties have been overcome by designing a basically small primary-secondary link-spread crossbar selector switching system which employs a reduced number of crosspoints at the primary and secondary switching apparatus compatible with the small size of the system, but with sufficient trunk-connecting capacity at the secondary switches for the trunks of a larger system, permitting expansion of the system to larger sizes by adding additional link-spread primary and secondary groups of switches as the need may arise, each such additional group of primary and secondary switches serving a separate group of incoming trunks and being associatable wtih the originally installed primary and secondary switches only through connections giving access to the same outgoing trunks.

Further according to the invention, a special feature of crosspoint economy resides in the employment of a group of overflow links common to all the primary switches of a switching group, thereby permitting the normal links between the primary and secondary switches to be reduced in number to equal the number of incoming trunk paths, rather than being about double the number of incoming trunk paths as heretofore. In the illustrative example, fifty incoming trunk paths are served by fifty normal links and ten overflow links from the primary switches and provide substantially the same efficiency in service as is ordinarily provided for fifty incoming paths by one hundred primary-secondary links, providing forty percent reduction in link paths, with a corresponding but slightly less reduction in the combined crosspoint capacity of the primary and secondary switches.

According to an additional feature, the control apparatus at a group of primary and secondary switches is considerably reduced without a corresponding increase in waiting time by providing two receivers of digit or designation information, with provisions for connecting them alternatively to the controller, whereby the controller can be extending a connection indicated by one receiver while the other receiver is receiving digit information for the next connection to be established. Conveniently, each of the receivers is associated with a separate half of the trunks incoming to the primary switches of the primary-secondary switching group.

A further feature relates to interlocking arrangements for the controllers for separate groups of primary and secondary switches in the same selector system. According to this feature, the controllers are permitted to operate individually without reference to each other except when two of them have received the same group designation, in which event one controller is allowed to proceed, while the operation of the other is held in abeyance until the first one has finished its operations, thereby avoiding the confusion which might result from two controllers testing the same group of outgoing trunks.

The above-mentioned and other objects and features of this invention and the manner of attaining them will become more apparent, and the invention itself will be best understood, by reference to the following description of an embodiment of the invention taken in conjunction with the accompanying drawings, comprising FIGS. 1 to 7, wherein.

Figures 1, 7:
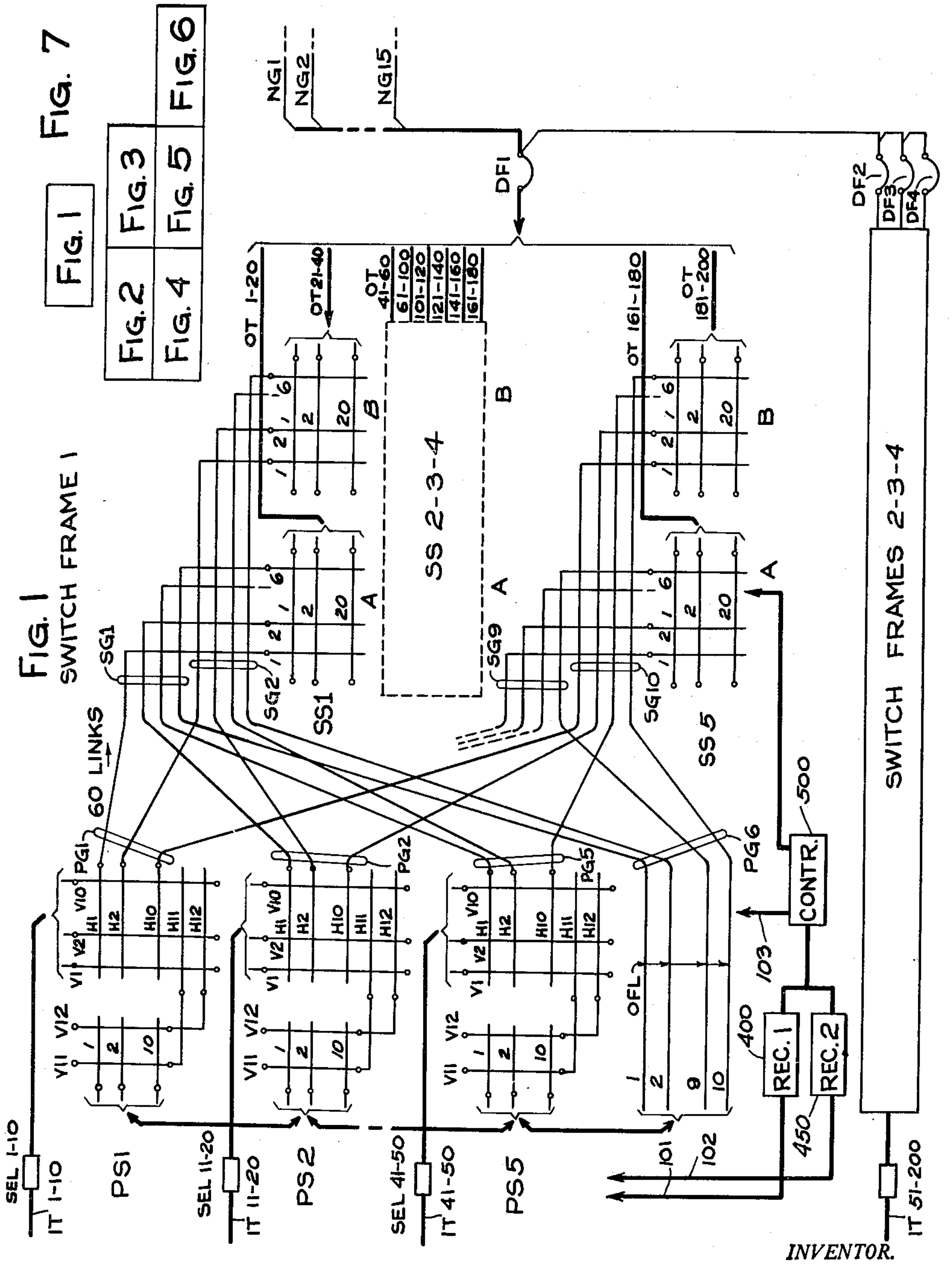
FIG. 1 is a schematic single-line diagram of connecting paths through a switch frame of primary and secondary switches according to the invention showing the receiver and control apparatus in block form and showing in block form three similar additional switch frames and their relationship to the first switch frame.

FIG. 7, on the same sheet with FIG. 1, shows how the sheets of drawings should be arranged to be understood best.

*The system—FIG. 1*

In the system of FIG. 1 four separately installable switch frames of crossbar switches are contemplated, with each switch frame having its own separate group of primary and secondary crossbar switches, with each switch frame serving a separate group of fifty incoming trunks (hereinafter often termed "in" trunks) and giving them access through the primary and secondary switches of the frame and their interconnected links to 200 outgoing trunks (hereinafter often termed "out" trunks). The switches on Switch Frame 1 comprise five primary switches PS1 to PS5, with switches PS1, PS2, and PS5 being shown diagrammatically in some detail, and switches PS3 and PS4 being indicated merely as a dotted rectangle. Five secondary switches are employed on the frame, of which SS1 and SS5 are shown diagrammatically in some detail, with switches SS2 to SS4 being indicated merely as a dotted rectangle.

Each primary switch PS1 to PS5 terminates a separate group of ten of the "in" trunks IT1 to IT50, each group of ten such trunks being indicated by a separate single line passing through a rectangle indicative of ten so-called selectors SEL, a separate selector for each trunk. One such selector SEL1 for "in" trunk IT1 is shown in circuit diagram in FIG. 2.

Each of the primary switches PS1 to PS5 is a modified 12 by 12 crossbar switch having twelve verticals V1 to V12 and twelve horizontals H1 to H12. Each such vertical and each such horizontal comprises a 3-wire path (conductors T, R, and S) as is shown in detailed circuit diagram in FIG. 2 for switch PS1.

Figure 2:
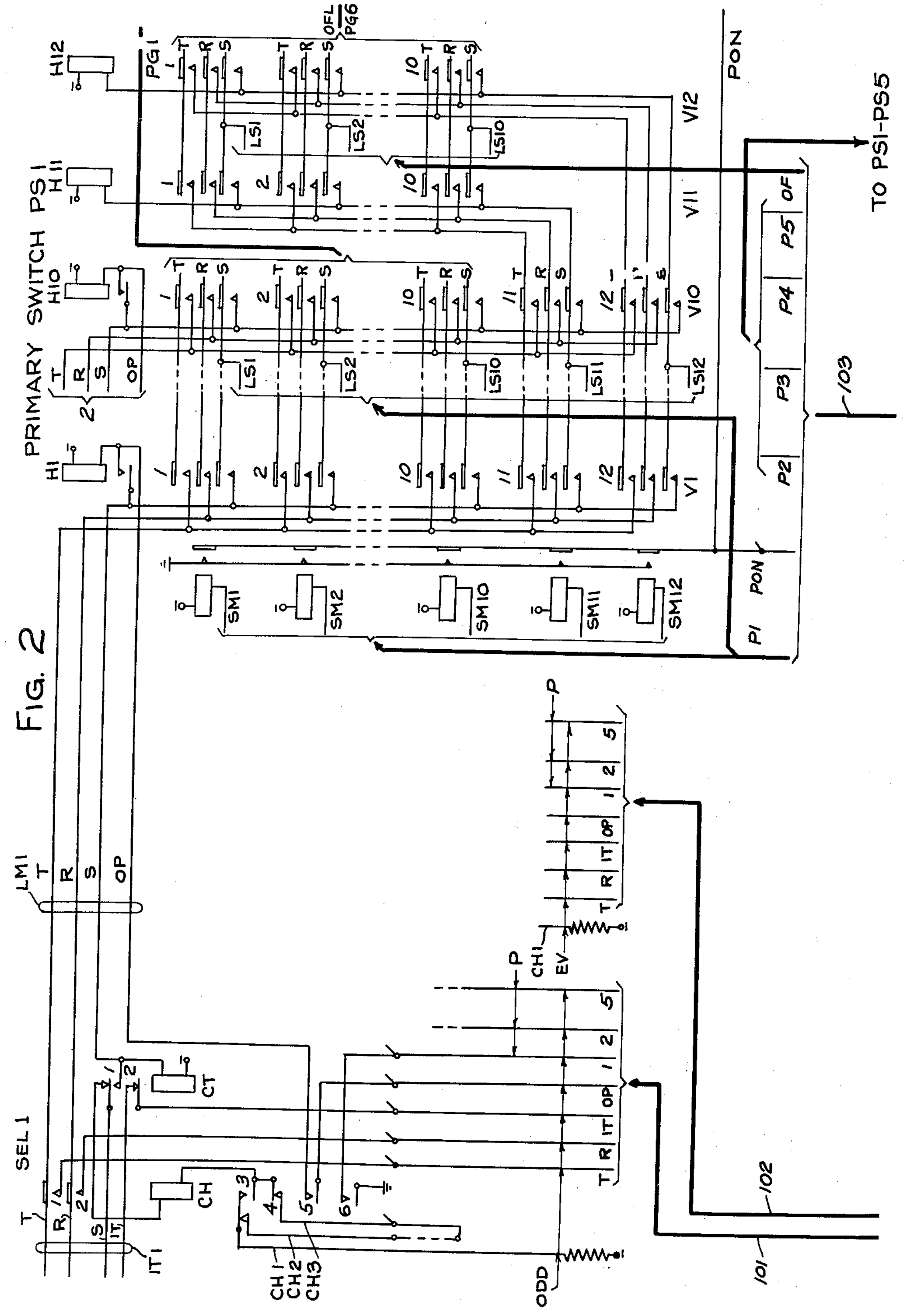
FIGS. 2 and 3 are circuit diagrams of one of the primary switches and one of the secondary switches of FIG. 1, showing also the relationship between the incoming trunks and the receivers, and showing a local distributing frame at which secondary-switch control connections are made according to the assignment of the outgoing trunks to numerical trunk groups.

The "in" trunks served by a primary switch by way of selectors SEL terminate respectively on verticals V1 to V10, with verticals V11 and V12 comprising overflow verticals which are reached through horizontals H11 and H12 respectively. Verticals V11 and V12 of any primary switch are shown to the left of verticals V1 and V10 in FIG. 1 to simplify the illustration of the spread of the links between the primary secondary switches, but are shown in FIG. 2 in their normal intended last-place position. Each primary switch PS1 to PS5 thus comprises ten verticals V1 to V10, twelve horizontals H1 to H12, and overflow verticals V11 and V12.

Horizontals H1 to H10 of switches PS1 to PS5 are terminal points for links extending to the secondary switches. These links comprise five normal groups of ten links each, comprising groups PG1 to PG5. The ten horizontals of the overflow sections OF of the primary switches are connected in multiple and extended to a sixth group of links OFL shown below primary switch PS5, and comprising the sixth primary group of links PG6.

Each of the secondary switches SS1 to SS5 is a 12 by 20 crossbar switch having twelve verticals and twenty horizontals. The horizontals of each of the secondary switches are centrally severed to provide two 3 by 20 secondary sections A and B. Any secondary switch thus gives each of the two 6-link groups access to a separate 40-trunk group of "out" trunks OT. For example, switch SS1 reaches "out" trunks OT1 to OT20 to give the secondary switch access to forty "out" trunks OT1 to OT20 through the horizontals of its section A, and reaches "out" trunks OT21 to OT40 through its section B. The "out" trunks reached from the other secondary switches are OT41 to OT160 for SS2 to SS4, and OT161 to OT180 for section A of SS5, and OT181 to OT200 for switch SS5.

With sections A and B for each secondary switch, switches SS1 to SS5 provide ten secondary sections. A standard spread is employed for the 10-link groups PG1 to PG6, with each such link extending to a separate secondary section and terminating there on the vertical corresponding to the primary group at which the link originates. For example, the links in primary group PG1 occupy vertical 1 on the respective secondary sections. The links extending to the secondary sections from the six 10-link primary groups PG1 to PG6 become ten 6-link secondary groups SG1 to SG10, each containing a separate link from each of the primary link groups PG1 to PG6.

Since the well-understood function of a selector system is, for each call incoming thereto over an "in" trunk, to select a numerical group of "out" trunks and to select and connect with an idle "out" trunk in the selected group, the "out" trunks OT1 to OT200 are divided into a desired number of numerical groups, with each group containing as many trunks as may be needed according to the traffic requirements of the numerical group. For example, if the selector system illustrated is employed at the hundreds selector stage of a telephone system, certain of the numerical groups extend to respective hundreds groups of switching apparatus, and each such hundreds group may require from twelve to fifteen trunks, with some heavy-traffic hundreds groups occasionally requiring up to perhaps twenty trunks each.

It is contemplated that some of the numerical groups (termed levels in step-by-step switching systems) may be used for special services, often requiring no more than five trunks or less, but sometimes requiring ten or fifteen trunks, and occasionally up to twenty. The trunk-assignment arrangement hereinafter described in somewhat more detail is such that any numerical trunk group requiring no more than ten trunks is made up of "out" trunks OT each extending from a separate one of the ten secondary sections, while a numerical group of twenty trunks comprises two "out" trunks OT from each secondary section.

In practice the physical grouping of trunks OT of Switch Frame 1 into numerical groups is accomplished at distributing frame DF1 whereat jumpers for the respective trunks are run according to the foregoing plan which is common to primary-secondary link-spread selector systems.

It will be observed that the "out" trunks beyond distributing frame DF1 are indicated as comprising fifteen numerical groups NG1 to NG15, which are multiplied to the right-hand side of distributing frames DF2 to DF4 associated respectively with similar Switch Frames 2, 3, 4 respresented by the rectangle at the bottom of FIG. 1.

All trunks of any numerical group NG not in excess of twenty trunks are preferably accessible from each of the four switche frames by way of jumpers on distributing frames DF1 to DF4. When a numerical group is required in excess of twenty trunks, any one of the four switch frames is given access to but twenty of the trunks of such numerical group, since traffic curves indicate that an access group of twenty has begun to approach a group size of maximum trunk efficiency.

When an initial installation is made requiring no more than fifty "in" trunks such as IT1 to IT50, only Switch Frame 1 and distributing frame DF1 need be installed, following which the additional switch frames and distributing frames DF may be installed as required by growth of the system, until the full number of four switch frames has been installed to complete the indicated system, which provides for 200 "in" trunks IT1 to IT200, with 200 "out" trunks for each of the switch frames, generally multiplied together through jumpers on the distributing frames DF1 to DF4.

Each switch frame is provided with its own common control apparatus. That apparatus of Switch Frame 1 comprises receivers 400 and 450, and controller 500. Receiver 400 is preferably connected only with the twenty-five odd-numbered ones of the selectors SEL1 to SEL50 (by way of the conductors in cable 101), and receiver 450 is preferably connected similarly with the twenty-five even-numbered ones of the selectors (by way of the conductors in cable 102). Receivers 400 and 450 are alternatively connectable to controller 500 by way of conductors in group 405. Controller 500 is connected with the primary switches PS1 to PS5 of Switch Frame 1 by conductors in cable 103, and is connected to the secondary switches SS1 to SS5 of the switch frame by conductors in cable 104.

Figure 3:
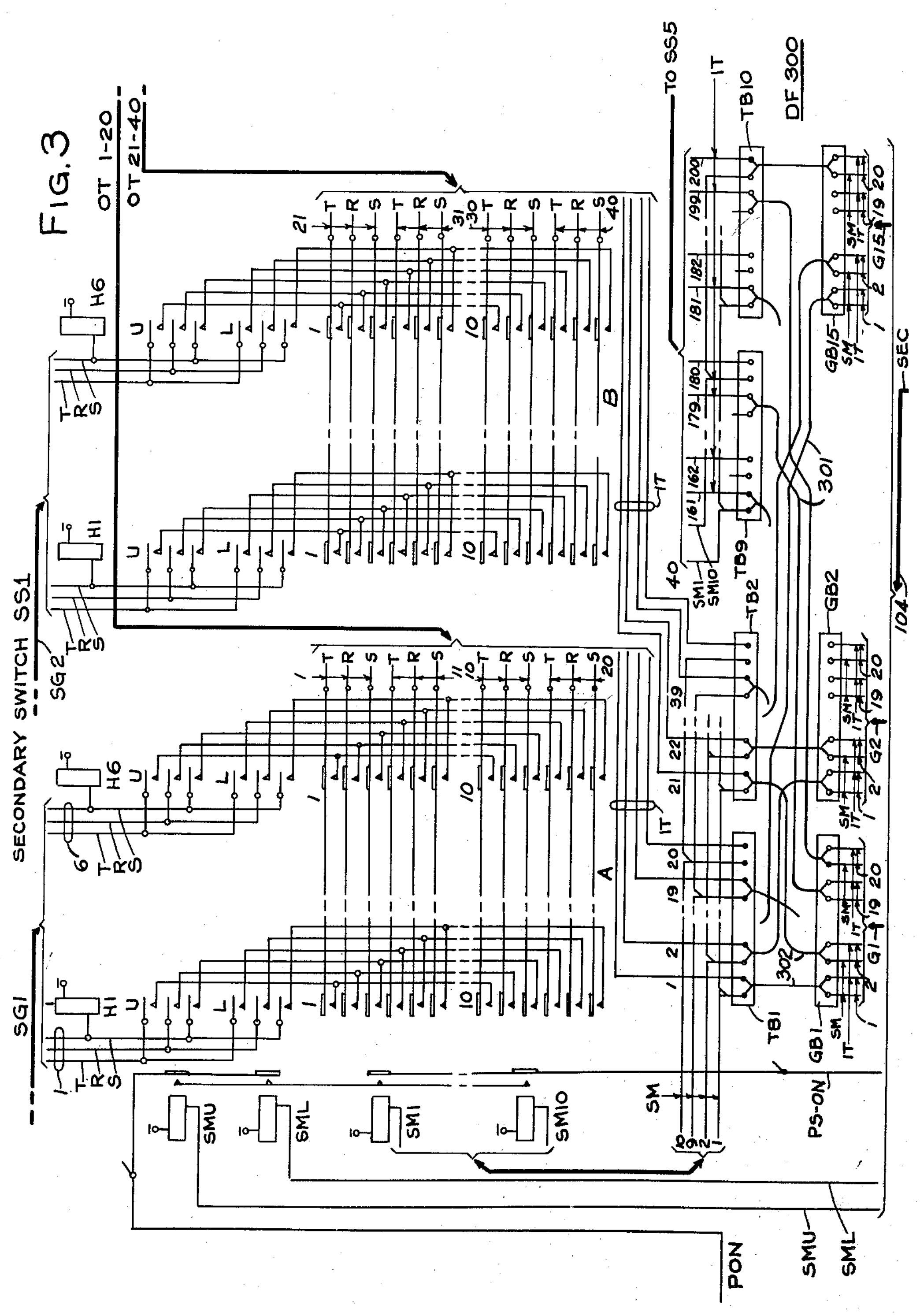

*Completing connections—FIGS. 2 and 3*

Referring now particularly to FIGS. 2 and 3, the completion of connections through the selector system will be described.

When idle, trunk IT1 incoming to selector SEL1 of FIGS. 1 and 2 is marked idle by a negative potential on conductor IT thereof from the ungrounded negative pole of the usual common battery or current source, reaching conductor IT of trunk IT1 from conductor IT in cable 101 (associated with the odd ones of the fifty selectors SEL of Switch Frame 1) by way of contacts 2 of cut-through relay CT of SEL1.

Figure 4:
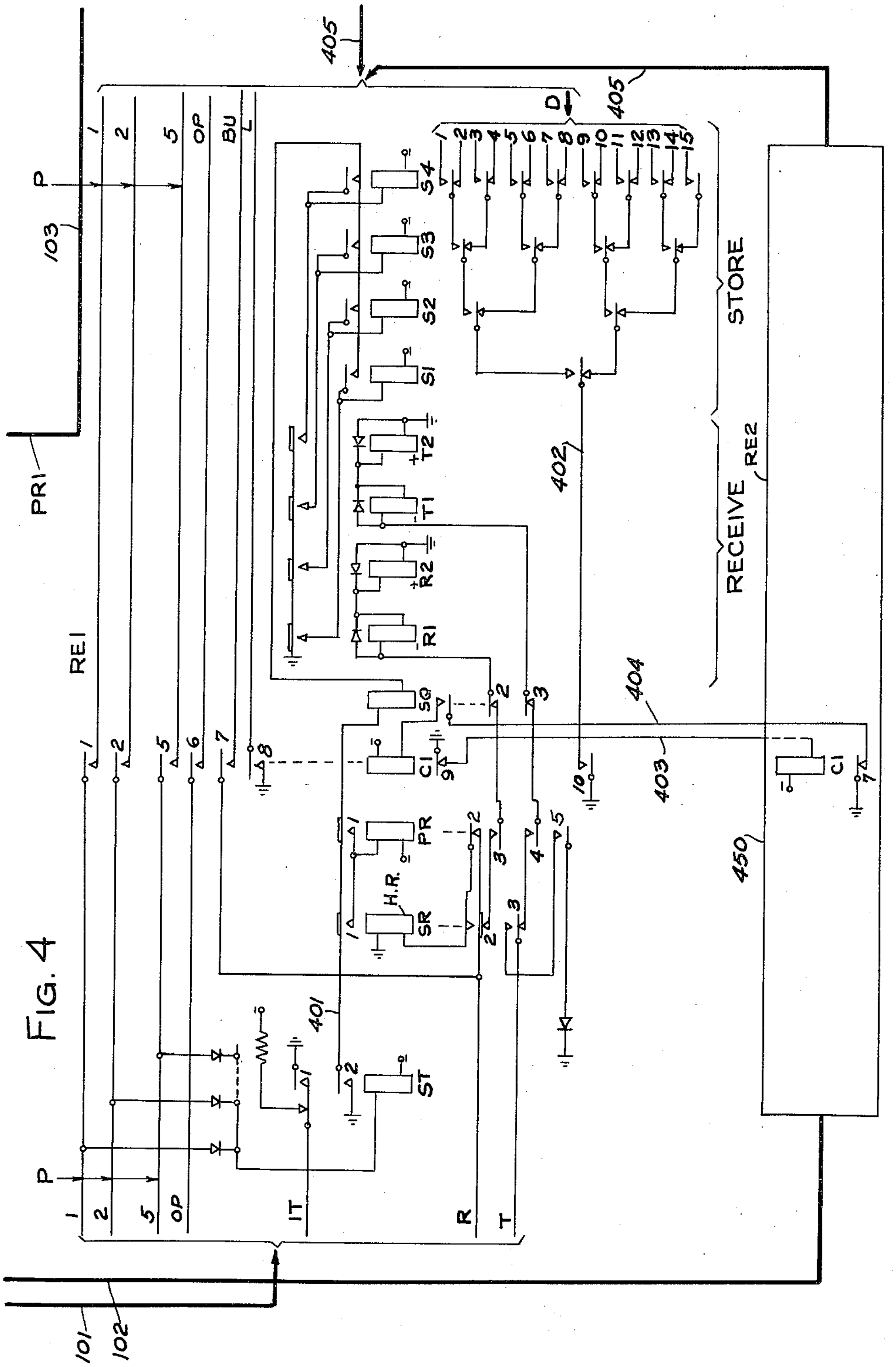
FIG. 4 shows the two similar receivers of FIG. 1 and their interrelation, one such receiver being shown in complete circuit diagram.

When "in" trunk IT1 is seized (by preceding switching apparatus, not shown, following the usual test thereof), sleeve conductor S of trunk IT1 is grounded in the usual manner, thereupon extending ground potential through back contact 1 of relay CT of SEL1 to the upper winding terminal of chain relay CH of SEL1. If receiver 400 of FIGS. 1 and 4 is idle, the odd-selector chain in which CH of relay SEL1 is included is closed. Consequently, negative potential is extended over CH1 of the Odd chain, through normally closed contacts 3 of relay CH, over conductor CH2, through similar chain contacts of the remaining odd-numbered ones of the selectors of the associated switch frame, chain-end conductor CH3, common to all of the odd-numbered selectors of the frame, and through contacts 4 of CH to the lower winding terminal of CH. Relay CH now operates. Its contacts 3 lock the lower terminal of relay CH to the incoming chain conductor CH1 and disconnect CH2; its contacts 4 complete the isolation of CH3 to preclude any other CH relay from operating thereover for the time being; and its contacts 5 prepare an operate circuit for hold magnet H1 of the associated primary switch PS1. Contacts 6 of CH ground primary-mark conductor P1 in cable 101 to mark the identity of primary switch PS1 with which IT1 and SEL1 are associated. Thereupon, receiver 400 replaces negative potential on IT of 101 by ground potential, thereby marking busy the remaining idle ones of the associated "in" trunks.

Contacts 1 and 2 of relay CH of SEL1 connect the tip and ring conductors T and R of "in" trunk IT1 respectively to tip and ring conductors T and R of cable 101 to cause digit or designating information received over conductors T and R of the "in" trunk IT1 to be delivered to the seized odd receiver 400, the operations of which are hereinafter described, as are those of the controller of FIGS. 5 and 6.

When the group designation is received at the seized receiver, it is transferred to the controller 500, along with the marked identity of the primary switch PS1, ground on P1 of cable 101. Controller 500 thereupon calls in for test the designated or called numerical group or "level" of "out" trunks, and calls in the twelve link sleeve conductors LS1 to LS12 of the marked primary switch PS1 over group conductor P1 of primary cable 103, along with the select magnet conductors SM1 to SM12 of PS1.

Figure 5:
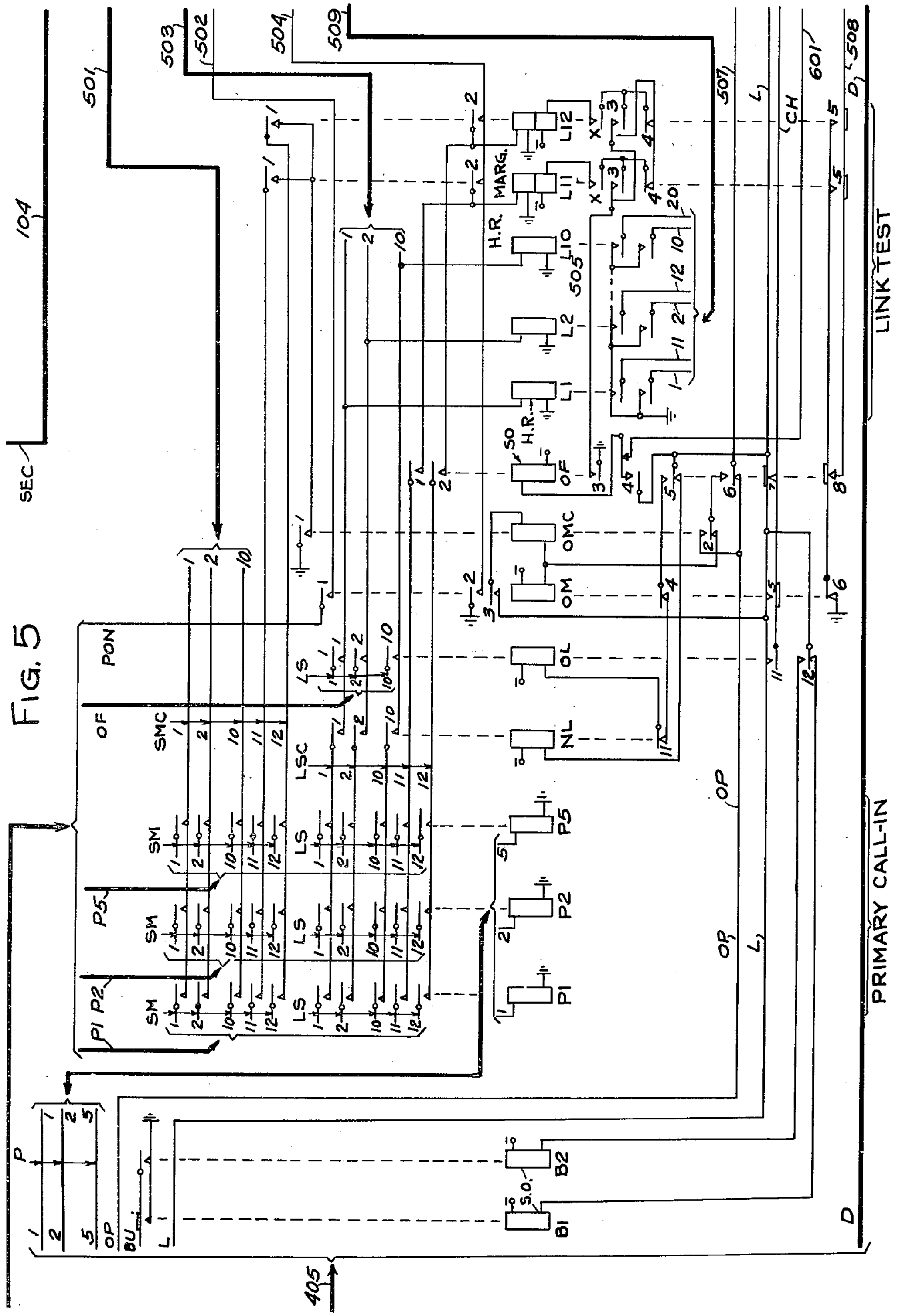
FIGS. 5 and 6 show the controller of FIG. 1 in circuit diagram.
Figure 6:
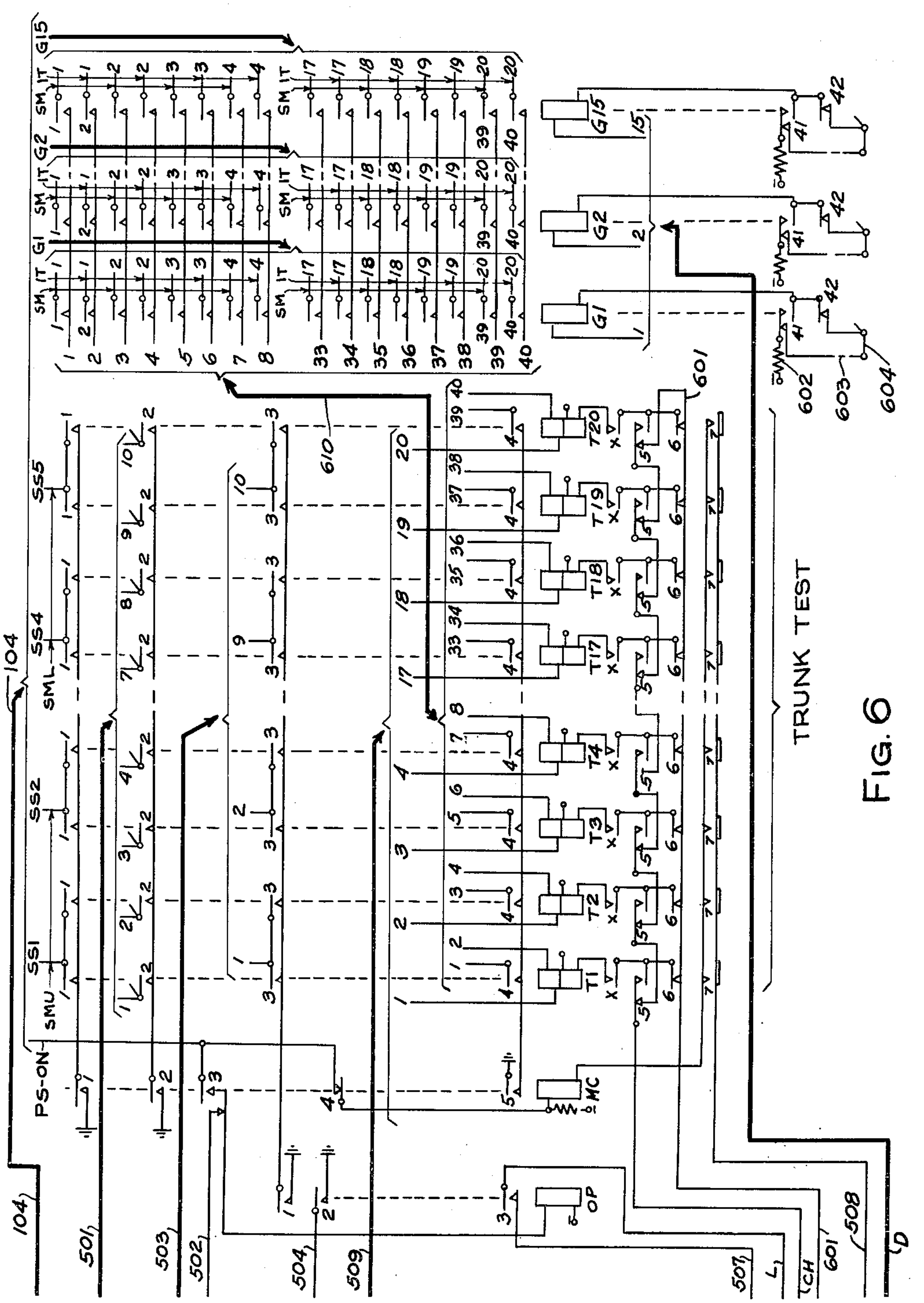

A testing operation (sometimes termed a matching operation) now occurs within the controller 500 of FIGS. 1, 5, and 6, which normally selects a matched path through an idle one of the ten normal links of the marked primary switch which extends to a secondary section which contains an idle trunk in the designated called numerical group of "out" trunks.

This matched path may be over link 1 of group PG1 of FIGS. 1 and 2 (which is also link 1 of group SG1 of FIGS. 1 and 3), and over "out" trunk OT1, comprising 3-wire horizontal 1 of section A of secondary switch SS1. Controller 500 thereupon operates select magnet SM1 of primary switch PS1 over the corresponding conductor in group P1 of control cable 103 to select the first link in primary group PG1 and secondary group SG1; it operates select magnet SM1 of secondary switch SS1 over its corresponding conductor and through a conductor of a jumper 301 of distributing frame DF300 to select the first of the ten 6-wire horizontals of the secondary switch SS1 which comprise the twenty 3-wire horizontals of the sections A and B of that switch; and it operates upper select magnet SMU of switch SS1 over the corresponding conductor of secondary control cable 104 to select stack-up U of the verticals of the secondary to prepare for connection to the selected first 3-wire horizontal of section A of switch SS1.

When any one of the select magnets of primary switch PS1 operates, its off-normal contacts ground primary off-normal conductor PON, which is common to primary switches PS1 to PS5 and which extends in common to the secondary switches SS1 to SS5, in addition to being a conductor in primary control cable 103. With either select magnet SMU or SML of SS1 operated, along with any one of the principal select magnets SM1 to SM10 of the switch, ground potential is extended to primary-secondary off-normal conductor PS–ON, common to the secondary switches SS1 to SS5. Ground on PS–ON notifies controller 500 that physical selection has occurred both at the primary switch and at the secondary switch through which the unclosed matched path extends. Thereupon, in the assumed example, the controller grounds link-sleeve conductor LS1 in group P1 of cable 103 and acts through the seized receiver 400 to ground operate conductor OP in cable 101. Ground on link sleeve conductor LS1 of group P1 of cable 103 operates magnet H1 of section A of SS1 over sleeve conductor S of the matched link. Thereupon, the selected stackups U and 1 of the associated secondary-switch vertical are closed, extending conductors T, R, and S of the matched link respectively to conductors T, R, and S of the matched "out" trunk OT1.

The noted grounding of conductor OP in cable 101 closes a circuit through contacts 5 of the operated relay CH of SEL1, and over conductor OP of LM1 for hold magnet H1 of primary switch PS1. The tip, ring, and sleeve conductors T, R, and S of local multiple LM1 (the switchboard extension of "in" trunk IT1) are thereby extended respectively, through stack 1 of vertical V1, to the conductors T, R, and S of horizontal 1 of the normal section N of primary switch PS1, being the horizontal from which extends the matched first link in groups PG1 and SG1, to the first vertical of section A of secondary switch SS1, from which the path has been closed as described to the matched idle trunk in the called numerical group.

Hold magnet H1 of primary switch PS1 also locks itself to conductor S of LM1 at the local contacts of the hold magnet, which has the immediate effect of placing operating ground on the latter conductor, whereupon cut-through relay CT of SEL1 operates. Contacts 2 of relay CT disconnect idle test conductor IT of trunk IT1 from conductor IT in cable 101 to maintain trunk IT1 marked busy to the preceding switching apparatus so long as the connection thus established is maintained. Contacts 1 of CT disconnect sleeve conductor S of IT1 from the upper terminal of relay CH and transfers it to conductor S of LM1, thereby completing the last point in the 3-wire connection established from "in" trunk IT1 through switches PS1 and SS1 to the selected matched trunk OT1 in the called group.

Holding ground is maintained on sleeve conductor S of the established connection in the usual manner to maintain hold magnets H1 of PS1 and H1 of SS1, section A, operated for as long an interval as the established connection is desired.

Relay CH of SEL1 restores responsive to the described operation of CT, freeing receiver 400 and controller 500, whereupon the operated select magnets of PS1 and SS1 are restored.

When the established connection is no longer desired, ground potential is removed at all points from the sleeve conductor S thereof, permitting the hold magnets of the crossbar switches PS1 and SS1 held thereover to restore, and permitting the restoration of cut-through relay CT of SEL1, whereby the established connection is completely broken down.

If, when the described tests or matching operations occur, no idle trunk in the called group can be found which can be reached over any idle one of the ten links in group PG1 of FIGS. 1 and 2, the inability to find a matched path may be due to all links in group PG1 or to all trunks in the called group being busy, or to a condition of idle links and idle trunks which do not appear at the same secondary sections. In this event, controller 500 makes an overflow test which comprises testing overflow links 11 and 12 of normal section N of primary switch PS1 (leading respectively to the overflow verticals V11 and V12 of PS1) and coincidentally repeats its matching attempt, this time testing the ten overflow links OFL (PG6) common to the five primary switches. If an overflow match is made, and is over link 11 of section N and over link 1 of OFL, controller 500 thereupon selects overflow vertical V1 of primary switch PS1 and operates select magnet SM1 of PS1 to select the matched overflow link, at the same time causing secondary select-magnet operation to occur as described to select the matched idle trunk in the called group.

When primary and secondary select-magnet operation has occurred, the controller grounds link sleeve conductor LS1 of group OF of cable 103. Hold magnet H6 of secondary switch SS1, section A, thereupon operates to extend overflow link 1 of group OFL (PG6) to the matched idle "out" trunk, such as OT1, in the called numerical group of level. At the same time, the controller grounds conductor LS11 in group P1 of cable 103 to operate hold magnet H11 of PS1 to connect overflow horizontal 11 of PS1 to the matched first overflow link in group PG6.

Controller 500 is arranged to maintain conductor LS1 grounded to maintain the operated primary and secondary hold magnets in operated condition until the controller has completed its operations.

Controller 500 now opens the closed select-magnet paths at the primary and secondary switches, permitting the select magnets to restore to normal condition, thereby ungrounding off-normal conductors PON and PS–ON. Thereupon, controller 500 grounds select-magnet conductor SM11 in group P1 of cable 103 to effect physical selection at PS1 of overflow horizontal 11, which has been extended as described to an idle trunk in the called group. Thereupon, responsive to the resultant regrounding of primary off-normal conductor PON, controller 500 acts to cause conductor OP in cable 102 to become grounded as described, thereby operating hold magnet H1 of PS1 to close the selected eleventh stackup of contacts thereof, thereby extending the calling "in" trunk IT1 through vertical V1 of PS1 to horizontal 11 to complete the connection which has been established from the last-named horizontal to the selected trunk in the called group.

Relay CT of SEL1 now operates and relay CH restores as described to terminate the seizure of the associated receiver 400 as described.

*Assignment of "out" trunks to numerical groups*

As described for FIG. 1, the assignment of the "out" trunks OT1 to OT200 of Switch Frame 1 is made by individual 3-wire jumpers (not individually shown) on distributing frame DF1 of FIG. 1, and for a maximum assignment of twenty "out" trunks of a switch frame to the same numerical group, two "out" trunks are assigned from each of the ten secondary sections into which switches SS1 to SS5 are divided. Moreover, the first ten "out" trunks of a group of twenty assigned to any numerical group comprise trunks selected from the first ten "out" trunks of respective secondary sections, while the second ten "out" trunks of the 20-trunk group comprise trunks selected from the second ten "out" trunks of the respective secondary sections.

With trunk assignments made as noted at distributing frame DF1 of FIG. 1, a simple and orderly arrangement of the select-magnet and idle-test conductors SM and IT in the fifteen numerical groups G1 to G15 of secondary control cable 104 is rendered feasible as shown at distributing frame DF300. There, ten trunk blocks TB1 to TB10 (TB3 to TB8 being not shown) comprise, ten sections into which the five secondary switches are divided. Each block TB1 to TB10 contains twenty pairs of terminals to which the switchboard wires extending out from the frame are attached and to which 2-wire jumpers 301 are attachable as required. The left terminal of any pair on any of the blocks TB1 to TB10 is connected to the one of the select-magnet conductors SM1 to SM10 of the associated secondary switch which must be energized to effect mechanical selection of the associated "out" trunk, while the corresponding right-hand terminal of any such pair is connected to the idle test conductor IT of the "out" trunk to which the terminal pair on the trunk block TB corresponds. For example, select-magnet conductors SM1 to SM10 of secondary switch SS1 are connected to the left-hand terminal of each of the first ten pairs on associated trunk block TB1 and TB2, and are also connected respectively to the left-hand terminal of each of the pairs 11 to 20 of the same two trunk blocks.

The right-hand terminals of pairs 1 to 20 of block TB1 are connected to idle-test conductors IT1 to IT20, being the idle-test conductors of "out" trunks OT1 to OT20, since each "out" trunk has an idle test conductor IT as shown for "in" trunk IT1 (FIG. 2), being a conductor which does not pass through the crossbar switching apparatus but is used by the common control apparatus for test purposes.

The fifteen numerical groups into which the "out" trunks may be divided are represented respectively by the conductor groups G1 to G15 in secondary control cable 104. Each of these conductor groups extends to its corresponding one of group blocks GB1 to GB15. Each group block has twenty pairs of terminals to which the twenty pairs of conductors in the associated conductor group attach as indicated, and from which two-conductor jumpers 301 may be extended to accord with the described pattern of assignment of the "out" trunks to the numerical groups.

Referring to the first numerical group of assigned "out" trunks, represented by conductors G1 and group block GB1, the illustrated 2-conductor jumpers 301 are extended from this block to accord with a 20-trunk assignment of "out" trunks of which the first ten are Nos. 1, 21, 41, 61, 81, 101, 121, 141, 161, and 181, and of which the second ten are Nos. 19, 39, 59, 79, 99, 119, 139, 159, 179, 199. Therefore, the first ten jumpers 301 extended from GB1 extend respectively to the first terminal pair on the trunk blocks TB1 to TB10, while the eleventh to twentieth jumpers 301 from block GB1 extend respectively to the nineteenth terminal pair of the trunk blocks TB1 to TB10. It will be understood, of course, that the orderly assignment arrangement indicated need not be followed precisely, the assignment being satisfactory so long as it accords with a jumper 301 from the left half of a block GB being extended to any terminal pair on the left half of the indicated corresponding truck block TB, and accords with a jumper from the right half of any block GB being extended to a terminal pair on the right half of the indicated corresponding trunk block TB.

When a numerical group of less than twenty "out" trunks (such as four, five, or ten trunks) is assigned, a correspondingly smaller number of jumpers 301 are extended from the corresponding group block GB to accord with the "out" trunks actually assigned to the numerical group.

*Receiver operation*

Since the two receivers 400 and 450 of FIGS. 1 and 3 may be identical, the circuit diagram shown in FIG. 4 of receiver 400 is illustrative also of the receiver 450. Consequently, the description of the operation of one of the receivers will suffice for both, keeping in mind that receiver 400 is assigned to the odd-numbered ones of the selectors SEL1 to SEL50 by way of cable 101, while receiver 450 is assigned to the even-numbered selectors of the same group by being connected thereto through the conductors in cable 102.

When the receiver 400 is seized, as by the described operation of the chain relay CH of selector SEL1, one of the five primary conductors P in cable 101 is grounded according to the primary switch with which the seizing selector is associated. Start relay ST of receiver 400 is thereupon operated from ground on the grounded conductor P and through the associated one of the illustrated isolating rectifiers. Contacts 1 of relay ST thereupon ground conductor IT of cable 101, at the same time disconnecting the normal supply of negative potential there-from, thereby substituting busy-indicating ground potential for the normal idle-indicating battery potential on conductor IT of each of the associated idle "in" trunks of the remaining odd-numbered selectors of the switch frame, which temporary busy condition is maintained until the receiver 400 has completed its operations and has been cleared out for common use. Contacts 2 of relay ST preparatorily ground conductor 401.

The receivers 400 and 450, together with the selectors SEL1 to SEL50 are arranged specifically for use in a register-sender system of the general type disclosed in the pending application of E. J. Leonard et al., Serial No. 629,282, filed December 19, 1956. Accordingly, when the tip and ring conductors T and R of the "in" trunk of the calling selector (selector SEL1 for example) are connected to conductors T and R of cable 101, high-resistance-sender-ready relay SR is operated over conductor R of cable 101 through contacts 2 of relay PR, subject to the sender being ready to transmit. Back contacts 2 and 3 of relay SR disconnect conductors R and T from the contacts of receiver-ready relay RR, and front contact 2 of SR locks SR operated independent of contacts 2 of relay RR. Contacts 1 of relay SR operate receiver-ready relay RR, which transmits a receiver-ready signal to the sender over conductor R, of cable 101, from ground through rectifier 406 and front contacts 4 and 3 of SR and RR. Thereupon, the sender momentarily disconnects its conductors corresponding to T and R of cable 101, restoring sender-ready relay SR, leaving receiver-ready relay RR operated and locked to conductor 401 at its contacts 1. Tip and ring conductors R and T of cable 101 are thereupon extended through contacts 3 and 4 of relays SR and RR and contacts 2 and 3 of relay SQ to the four rectifier-polarized relays R1, R2, and T1, T2 for the receipt of stored digit or designation information in code from the sender. This information comprises a short burst of alternate positive and negative impulses in a selected combination over conductor R or T, or both, according to the digit or designation value to be transmitted. As a consequence, the ones of the polarized receiving relays R1 to T2 which correspond to respective received polarized impulses are operated momentarily. Any operated receiving relay closes an operating circuit for the corresponding one of the four storage relays S1 to S4. Any storage relay, on operating, locks itself to ground on conductor 401, through the winding of sequence relay SQ. Sequence relay SQ remains short-circuited as long as any one of the receiving relays R1 to T2 remains operated, but operates in the locking circuit of the operated storage relays when all of the receiving relays R1 to T2 have restored.

Contacts 2 and 3 of sequence relay SQ disconnect the incoming conductors T and R from receiving relays R1 to T2, and contacts 1 of SQ operate cut-in relay CI of receiver 400, subject to cut-in relay CI of receiver 450 being in its illustrated restored condition, wherein it maintains its guard conductor 404 grounded. Contacts 9 of relay CI of 400 remove ground from guard conductor 403 of receiver 400, thereby precluding operation for the time being of relay CI of receiver 450; contacts 1 to 5 of CI of 400 connect primary conductors P1 to P5 and OP of cable 101 to the corresponding conductors of controller 500; its contacts 7 connect busy signal conductor BU of the receiver to the corresponding conductors BU of the controller; its contacts 8 ground lock conductor L of the controller; and its contacts 10 ground conductor 402 leading to the apex of the contact pyramid of the storage relays S1 to S4, thereby grounding the one of the fifteen digit or designating conductors of group D of the controller which has been selected by the operated combination of storage relays S1 to S4.

Receiver 400 now waits until the controller operations to be described hereinafter occur, culminating either in the establishment of a connection through the selector apparatus to an idle trunk in the called group as described (in which case relay CH of the calling sender is restored as described to free the receiver), or in the return of a busy signal over conductor BU of the controller and through contacts 7 of relay C1, to ground conductor R of group 101. In the latter event, the calling sender is notified that no idle path is available, whereupon the connection to the calling "in" trunk is broken down under the control of the sender, causing the release of relay CH of the calling selector to free the receiver 400 by ungrounding the grounded one of the conductors P in group 101.

When the receiver 400 is freed, its start relay ST restores, replacing idle-indicating battery potential on conductor IT of group 101 to render available the remaining idle ones of the associated odd-numbered selectors of the switch frame, at the same time ungrounding conductor 401, thereby restoring relays RR and SQ, along with the operated one or ones of the storage relays S1 to S4. Cut-in relay CI is restored by relay SQ, completing the clearing out of the receiver 400 for the next use to be made thereof. Contacts 9 of relay CI reapply ground potential to guard conductor 403 of receiver 400 to permit receiver 450 to obtain access to the common controller, as when the receiver 450 has in the meantime been seized and has stored a designation for transfer to the controller.

*Controller operation*

Referring to FIGS. 5 and 6, when the controller 500 shown therein and in FIG. 1 is seized over cable 405, by either of the controllers 400 and 450, it calls in the primary switch with which the calling selector is associated and calls in the called or designated numerical group of "out" trunks.

If, for example, primary conductor P1 in cable 405 is the one of the five conductors P1 to P5 which is grounded, primary call-in relay P1 (FIG. 5) is the one operated, and the controller is thereby associated specifically with primary switch PS1 of FIGS. 1 and 2, in that the twelve select-magnet conductors SM1 to SM12 and the link-sleeve conductors LS1 to LS12 in group P1 of primary control cable 103 are extended respectively to the common conductors SM1 to SM12 and LS1 to LS12. Moreover, if the group or digit designation stored in the seizing receiver is the digit 1, a digit wire of group D in cable 405 is grounded, thereby closing a circuit for the corresponding first-group relay G1, which includes contacts 42 thereof, chain-end conductor 604 of the preference lockout chain extending between relays G1 of the controllers on the several switch frames, chain contacts at the other controllers indicated by dotted connection 603, normally closed chain contacts 41 of G1, to battery by way of resistor 602. Contacts 41 of relay G1 lock the winding of G1 directly to the incoming operating chain, at the same time breaking the operating chain to the corresponding group relays of the other controllers, and contacts 42 disconnect the winding of G1 from chain-end conductor 604 to complete the chain isolation. Thereby, the corresponding group relays in the other controllers are prevented from operating for the time being to avoid the confusion that could result if two or more controllers were allowed to be testing the same numerical group of "out" trunks at the same time. Contacts 1 to 40 of relay G1 connect the twenty pairs of select-magnet and idle-test conductors SM1 to SM20 and IT1 to IT20 in conductor group G1 of secondary control cable 104 to the corresponding conductors in common group 610, which are associated with the twenty trunk-test relays T1 to T20 of the controller.

In addition to causing the described primary call-in and group call-in operations, the described seizure of the controller, causes locking conductor L in group 405 to become grounded from the seizing receiver to prepare certain circuits in the controller for use as needed. An immediate result of the grounding of conductor L is the operation of normal-links relay NL, through back contact 5 of overflow relay OF. Relay NL thereupon connects the link-sleeve common conductors LSC1 to LSC10 respectively to the windings of link-test relays L1 to L10, as well as to the conductors 1 to 10 in group 503. Link-test relays L1 to L10 now operate, each subject to the presence on the sleeve of its associated normal link in the called-in primary switch being idle, as indicated by a battery potential on its link-sleeve conductor LS. For example, if link 1 of the assumed called-in primary switch PS1 of FIGS. 1 and 2 is idle, battery potential stands on the link-sleeve conductor LS1 thereof, through the winding of hold magnet H1 of section A of secondary switch SS1, to which the link extends, being link 1 of group PG1 and SG1. The windings of the link relays L1 to L10 are of high resistance (as noted by the label H.R. for relay L1), and the same is true of the upper windings of link-test relays L11 and L12, wherefore a hold magnet cannot be effectively operated through any such winding. Upon operating, any link relay L1 to L10 grounds the associated two of the conductors 1 to 20 in group 509, which conductors extend respectively to the high-resistance upper windings of trunk-test relays T1 to T20. The operation of any link relay L1 to L10 thus supplies ground to the upper winding of its two corresponding trunk-test relays permitting energization of such upper windings to occur, each subject to the "out" trunk with which it is currently associated through its corresponding contacts of the operated group relay G1 being idle, as indicated by battery potential on the idle-test conductor IT thereof. If, for example, relays L1 to L10 all operate as an indication that all links of the called-in primary switch are idle, the upper windings of all twenty trunk-test relays T1 to T20 are energized if the designated called group contains twenty trunks and all of them are idle.

Each of the trunk-test relays T1 to T20 is "marginal" as indicated by the label Marg. applied to relay T1. When energized only by its upper winding, any trunk-test relay T1 to T20 is able to actuate only its lightly adjusted contacts X. The closure of contacts X of any relay T1 to T20 closes an effective operating circuit for the relay through its lower winding, which operating circuit is from ground on locking conductor L, through contacts 7 of overflow relay OF, chain conductor CH, the normally closed chain contacts 5 of each of the relays T1 to T20, chain-end conductor 601, contacts 6 of the relay, its contacts X, and thence to battery through the lower winding of the relay. Any T relay, on operating, locks its lower winding to ground through the contact chain at its make contact 5; isolates its lower winding from chain-end conductor 601 at its contacts 6, and at its normally closed contacts 5 opens the ground chain to the succeeding ones of the test relays. As a consequence, only the first one of the test relays T in the chain extending from T1 to T20 which is able to operate effectively can remain operated and all effectively operated trunk-test relays succeeding the first effectively operated one are restored with respect to all contact sets thereof except the lightly adjusted X contacts of the relay, which are without effect as long as the control chain is held open.

Upon the effective operation of any trunk-test relay T1 to T20, contacts 1, 2, and 4 thereof prepare appropriate select-magnet circuits controlled by match-complete relay MC; contacts 3 thereof prepare an operate circuit, controlled by operate relay OP, for the secondary hold magnet to which the corresponding link extends; and contacts 7 thereof close an operate circuit for match-complete relay MC.

Relay MC operates at the end of a slight interval following trunk-test relay operation, which is sufficient to insure that only one of the test relays T1 to T20 is still in effective operated condition as described. Contacts 1, 2, and 5 of relay MC complete the select-magnet circuits prepared by contacts 1, 2, and 4 of the operated T relay, while its contacts 3 prepare a circuit for relay OP over primary-secondary off-normal conductor PS–ON.

If, for example, trunk-test relay T1 is the one operated, upper select magnet SMU of the first secondary switch SS1 is operated through contacts 1 of relays MC and T1 and over conductor SMU for secondary switch SS1 in secondary control cable 104. At the same time, with the trunk assignment as described and as illustrated by jumpers 301 on distributing frame DF300, principal select magnet SM1 of secondary switch SS1 is operated through contacts 5 and 4 of relays MC and T1, conductor 1 of group 610, contacts 1 of group relay G1, select magnet conductor SM1 in group G1 of control cable 104, the corresponding conductor in the first 2-wire jumper 301 on frame DF300, and thence over select-magnet conductor SM1 of secondary switch SS1 to the corresponding select magnet SM1 of the switch, to effect physical selection of first "out" trunk 1 of either section of SS1.

At the same time, contacts 2 of relays MC and T1 operate select magnet SM1 of the calling primary switch PS1 (to effect physical selection of the matched first link in group PG1), over conductor 1 in group 501, conductor SMC1, contacts 1 of relay P1, and thence over select-magnet conductor SM1 of primary group P1 in primary-control cable 103.

When the primary and secondary select magnets have operated to effect selection at the crossbar switches of the matched idle link and the matched idle "out" trunk selected by the controller, select magnet SM1 of primary switch PS1 grounds primary off-normal conductor PON (common to all the primary switches of the first switch frame). Ground on conductor PON is extended through contacts of select magnet SMU of secondary switch SS1, and contacts of select magnet SM1 of the same switch, to primary-secondary off-normal conductor PS–ON, common to all secondary switches of the first frame, thereby closing a circuit through front contact 3 of relay MC of the controller for operate relay OP. Contacts 1 of relay OP ground the link sleeve conductor (LS1 of primary switch PS1 in the assumed example) by way of contacts 3 of relay T1, to conductor 1 in group 503, thereby short-circuiting the winding of link-test relay L1 to effectively energize hold magnet H1 of section A of SS1 to which the matched link extends. Thereupon, hold magnet H1 of section A of secondary switch SS1 is operated to close its selected contact stacks U and 1 to extend the associated matched link to the idle matched "out" trunk OT1.

At the same time, contacts 3 of OP extend ground from conductor L over conductor 507 and thence through back contact 6 of relay OF to the operate conductor OP, to cause the described hold magnet operation to occur in primary switch PS1 at the vertical (such as V1) associated with the calling "in" trunk, whereupon the described cut-through action of the selector takes place to free the receiver which has seized the controller. When that occurs, the receiver such as 400 is cleared out and restores its cut-in relay CR to free the controller 500. The operated relays P1 and GE of the controller 500 thereupon restore responsive to the disconnection of their respective operating conductors. At the same time, conductor L of controller 500 is ungrounded, restoring relay NL and restoring the operated trunk-test relay T1, which restores MC and OP in succession. The energized select magnets of switch PS1 and SS1 are deenergized responsive to the described restoration of relays P1, T1, and G1, whereupon off-normal conductors PON and PS–ON are responsively ungrounded. In order to avoid possible premature reoperation of relay MC when controller 500 is immediately seized by the other receiver in waiting condition, contacts 4 of relay MC normally connect the junction of the upper winding terminal of MC to conductor PS–ON, whereby an immediate attempt to reoperate relay MC by a relay T1 to T20 in a new cycle of operations finds the winding of relay MC short-circuited by ground on PS–ON until the select magnets operated on the previous matched condition have restored.

*Overflow controller operation*

If, when the controller is seized as described, none of the trunk-test relays T1 to T20 can operate rather promptly, which occurs when no match can be made over any one of the ten normal links extending from the calling primary switch, slow-operating overflow relay OF operates from ground on chain-end conductor 601, responsive to the described grounding of locking conductor L. Relay OF preferably has a fairly inductive winding and a comparatively heavy restoring spring tension. Normally, the ground on chain-end conductor 601 is broken by the operation of one of the relays T1 to T20 before relay OF can operate.

When relay OF operates, its contacts 4 lock it to conductor L; its contacts 3 ground chain-in conductor 505 of overflow-link test relays L11 and L12; its contacts 5 disconnect normal-links relay NL and prepare a circuit for overflow-links relay OL; its contacts 7 disconnect chain conductor CH from grounded conductor L to prevent spurious or last-moment operation of any of the relays T1 to T20 while the test shift is being made from normal links to overflow links; and its contacts 8 unground conductor 508 to prevent operation of match-complete relay MC unless overflow link-test relay L11 or L12 operates.

On restoring, relay NL disconnects the normal-links conductors LSC1 to 10 from link relays 1 to 10 and from conductors 503, and contacts 11 of NL complete a circuit for relay OL through front contact 5 of OF and contacts 4 of OM. Relay OL, at its contacts 1 to 10, connects link sleeve conductors LS1 to LS10 of the overflow group OF in primary control cable 103 (being the sleeve conductors of the overflow links 1 to 10 in overflow group PG6 of FIGS. 1 and 2) to relays L1 to L10 and conductors 503, and it reconnects chain conductor CH to grounded conductor L to permit overflow-match operation to a relay T1 or T2 to occur.

The ones of the link test relays L1 to L10 which correspond to idle links of the common overflow group PG6 now operate as before described, and each prepares an operate circuit for its associated two of the test relays T1 to T20. If an idle path is possible to an idle trunk of the called numerical group through one of the common overflow links, that fact is now indicated by the effective operation of one of the test relays T1 to T20 as described.

Contacts 1 and 2 of overflow relay OF connect LSC11 and 12 to the test windings of relays L11 and L12 for energization sufficient to close the X contacts thereof subject to the respective local overflow links of the called-in primary switch (such as PS1, FIGS. 1 and 2) being idle. Contacts X, 3, and 4 of relays L11 and L12 correspond to contacts X, 5, and 6 of T1 to T20, wherefore only one relay L11 or L12 can remain effectively operated.

If relay L11 or L12 effectively operates along with a relay T1 to T20 as described, relay MC operates through their contacts 5 and 7, keeping in mind that contacts 8 of OF are open. Relay MC now causes primary and secondary select magnet operation to occur as described to effect physical selection of the matched common overflow link and of the matched "out" trunk in the called numerical group. Thereupon operate relay OP is actuated over conductor PS–ON and through contacts 3 of relay MC. Contacts 1 of relay OP cause hold magnet operation to occur at the secondary switch to which the matched common overflow link extends. If relays P1 and L11 are the ones operated, contacts 2 of relay OP ground conductor 504 to close an operate circuit for the eleventh hold magnet of the calling primary switch by short-circuiting the high-resistance upper winding of the operated link relay L11 thereby effecting seizure of the matched common overflow link in group PG6. Contacts 3 of relay OP ground conductor 507 thereby closing a circuit through front contact 6 of the operated relay OF and back contact 2 of relay OMC for the overflow-match relay OM. Relay OM now operates and locks itself to ground on conductor L at its contacts 3, through the winding of overflow-match-complete relay OMC, the latter relay being short-circuited for the time being and remaining unoperated. Contacts 1 of OM make an additional ground connection to conductor 504 to hold the operated overflow hold magnet of the primary switch until the overflow connection is completed, which requires one more setting of the select magnets of the primary switch.

Contacts 5 shunt contacts 11 and 7 of OL and OF to maintain CH grounded, and contacts 6 of OM disconnect ground from conductor 508, thereby restoring match-complete relay MC. Relay OP, however, remains operated through the restored contacts 3 of MC, contacts 1 of OM, and over primary off-normal conductor PON, until the operated select magnet of the calling primary switch has restored (responsive to the restoration of MC) in readiness for a new primary-switch select-magnet setting. Thereupon, relay OP restores, opening the initial operating circuit of relay OM, whereupon overflow-match-complete relay OMC operates in the locking circuit of relay OM. Contacts 1 of OMC close a circuit through contacts 1 of the operated eleventh-link relay L11 and over SMC11 for select magnet SM11 of the calling primary switch to effect selection of the eleventh horizontal in normal section N of the calling primary switch such as PS1. The closed eleventh vertical V11 of the primary switch is thereby selected within the primary switch in readiness for operation of the one of its hold magnets H1 to H10 with which the calling selector is associated. Primary off-normal conductor PON is thus again grounded, reoperating operate relay OP through contacts 1 of relay OM, and contacts 3 of the restored relay MC. Conductor 507 is again grounded at contacts 4 of OP. At this time, ground is thereby extended through contacts 6 and 2 of relays OF and OMC to ground conductor OP of the controller, thereby causing the described normal or cut-through primary hold-magnet operation to occur, followed by the described cut-through operation of the calling selector. The calling "in" trunk is thereby extended to the matched overflow link, which has already been extended as described over the matched path to the selected idle "out" trunk.

Responsive to the described cut-through operation, the seizing receiver is freed, and it thereby frees the controller 500, for its clearout operation generally as hereinbefore described. Relays OM, OMC, and OF restore responsive to the removal of ground from conductor L, and either operated one of the relays L11 and L12 restores responsive to the removal of ground from conductor 505 by relay OF.

*All paths busy*

If all paths to idle "out" trunks in the called numerical group are busy, one or the other of the slow-operating busy relays B1 and B2 operates in controller 500, FIGS. 5 and 6.

When the controller 500 is seized as described, the ground potential then applied to locking conductor L thereof closes a circuit through back contact 12 of overflow-links relay OL for slow-operating busy relay B1. If a normal match is made as described, controller 500 completes its operations and clears out as described thereby deenergizing the winding of relay B1 before that slow-operating relay has had time to operate. On the other hand, if no normal match can occur, that fact is indicated by the described operation of the slow-operating relay OF, which operates in a shorter interval of time than that required for the operation of either relay B1 or B2. A moment later, relay NL restores and relay OL operates, as described. Contacts 12 of relay OL transfer the energizing ground potential from relay B1 to relay B2, which provides a measured time interval for the described overflow matching operation to occur.

If no overflow match is possible, that fact is indicated by the failure of relay OM to operate as described, thereby giving busy relay B2 time to operate and ground the associated conductor BU to return a busy signal.

If an overflow match occurs, relay OM operates as described and restores relay OL, contacts 12 of which transfer the energizing ground from busy relay B2 back to busy relay B1 to cause a busy signal to be returned if, for any reason, the effected matching operation fails to cause the normal described clearing-out operation of the controller and of the seizing receiver to occur.

While I have described above the principles of my invention in connection with specific apparatus, it is to be clearly understood that this description is made only by way of example and not as a limitation to the scope of the invention.

I claim:

1. Selector switching apparatus for interconnecting incoming trunks with respective idle outgoing trunks by way of respective idle interposed link consisting of normal links and overflow links, comprising primary switching apparatus interposed between the incoming trunks and the links and secondary switching apparatus interposed between the links and the outgoing trunks, local links, the incoming trunks, the primary switching apparatus, the local links, and the primary end of the normal links being divided into similar primary groups each containing a normal section of switching apparatus operable to connect any incoming trunk of the group with any normal link or with any local link thereof and an overflow section of switching apparatus operable to connect any local link of the group to any said overflow link; the secondary end of the normal and overflow links, the secondary switching apparatus, and the outgoing trunks comprising similar separate secondary groups each containing switching apparatus operable to connect any link thereat to any outgoing trunk thereat; the normal links of each primary group, and the overflow links, each extending from the primary switching apparatus to a separate secondary group; the outgoing trunks comprising numerical groups each containing trunks extending from more than one secondary group, means for seizing any idle incoming trunk, means controlled over the seized trunk for designating any desired called numerical group, means responsive thereto for selecting a matched normal path, if available, from the calling incoming trunk over an idle normal link to an idle trunk in the called numerical group, means for operating switching apparatus in the pertaining primary and secondary groups to close the matched path, and means responsive to no matched normal path being available for selecting a matched overflow path, if available, from the normal section of the primary group containing the calling trunk to the overflow section thereof by way of an idle local link, and thence over an idle overflow link to an idle outgoing trunk in the called numerical group, and means for operating switching apparatus in the normal and overflow sections of the pertaining primary group and in the pertaining secondary group to close the matched overflow path.

2. Selector switching apparatus according to claim 1, wherein the said switching apparatus at any said primary group comprises a crossbar switch having its horizontal multiple divided to comprise the said normal and overflow sections.

3. Selector switching apparatus according to claim 2, wherein each said crossbar switch includes select magnets common to both said sections and separate hold magnets for each section, the said means for operating the switching apparatus to close the said matched overflow path comprising means for effecting successive select-magnet operations for the respective sections of the pertaining crossbar switch, and means for causing each said select-magnet operation to result in hold-magnet operation in the pertaining section of the crossbar switch to close the pertaining portion of the matched overflow path.

4. Selector switching apparatus according to claim 1, wherein the number of incoming trunks at any said primary group equals the number of said normal links thereat.

5. A selector switching system according to claim 1, wherein the number of incoming trunks at any said primary group equals the number of said normal links thereat, and equals the number of said overflow links.

6. Selector switching apparatus according to claim 1, wherein the said primary and secondary groups and the said links comprise a switchboard frame whereat a limited number of said incoming trunks may be terminated, and whereat the said outgoinng trunks may be terminated in a number sufficient to handle the traffic from more than one such swttchboard frame, at least one other smiliar frame, the said outgoing trunks being accessible in common from the separate frames.

7. Selector switching apparatus according to claim 6, wherein each said frame includes its own said means for selecting a matched path, and means responsive to the path-selecting means for one said frame being in the process of selecting a matched path to an idle trunk in a given numerical group for holding in abeyance the operations of the path-selecting at any other said frame with respect to the same numerical group.

8. Selector switching apparatus for interconnecting incoming trunks with respective idle outgoing trunks by way of respective idle primary-secondary-spread interposed links consisting of normal links and overflow links; comprising normal primary switching apparatus interposed between the incoming trunks and the normal links, overflow primary switching apparatus preceding the overflow links, and secondary switching apparatus interposed between all said links and the outgoing trunks, local links; the incoming trunks, the normal primary switching apparatus, the local links, and the primary end of the normal links being divided into similar normal primary groups each containing switching apparatus operable to connect any incoming trunk of the group with any normal link or any local link thereof; an overflow primary group of switching apparatus operable to connect any said local link to any said overflow link; the secondary end of the primary-secondary-spread links, the secondary switching apparatus, and the outgoing trunks comprising similar separate secondary groups each containing switching apparatus operable to connect any link thereat to any outgoing trunk thereat; the primary-secondary-spread links of each said primary group, each extending from the primary switching apparatus to a separate secondary group; the outgoing trunks comprising numerical groups each containing trunks of more than one secondary group, means for seizing any idle incoming trunk, means controlled over the seized trunk for designating any desired called numerical group, means responsive thereto for selecting a normal matched idle path, if available, from the calling incoming trunk over an idle normal link extending from the primary group containing the calling incoming trunk to a secondary group containing an idle trunk in the called numerical group, means for operating switching apparatus in the matched primary and secondary groups to close the matched path, and means responsive to no normal matched idle path being available for matching an overflow path, if available, from the normal primary group containing the calling trunk to the overflow primary group by way of an idle local link, and thence over an idle overflow link extending to a secondary group containing an idle outgoing trunk in the called numerical group, and means for operating switching apparatus in the matched normal and overflow primary groups and in the matched secondary group to close the matched overflow path.

9. Selector switching apparatus according to claim 8, wherein the said local links comprising pairs extending respectively from the said normal primary groups to said overflow primary group.

10. Selector switching apparatus according to claim 9, wherein said incoming trunks at any said normal primary group is equal in number to the number of said primary-secondary-spread links thereat.

11. Selector switching apparatus according to claim 9, wherein the number of said incoming trunks at any said normal primary group is twice the number of the normal primary groups.

12. Selector switching apparatus according to claim 9, wherein the number of said incoming trunks at any said normal primary group is twice the number of the normal primary groups, and is equal to the number of primary-secondary-spread links at any said primary group.

References Cited in the file of this patent

UNITED STATES PATENTS 2,674,657 Bellamy et al. ------------ Apr. 6, 1954